UNITED STATES PATENT OFFICE.

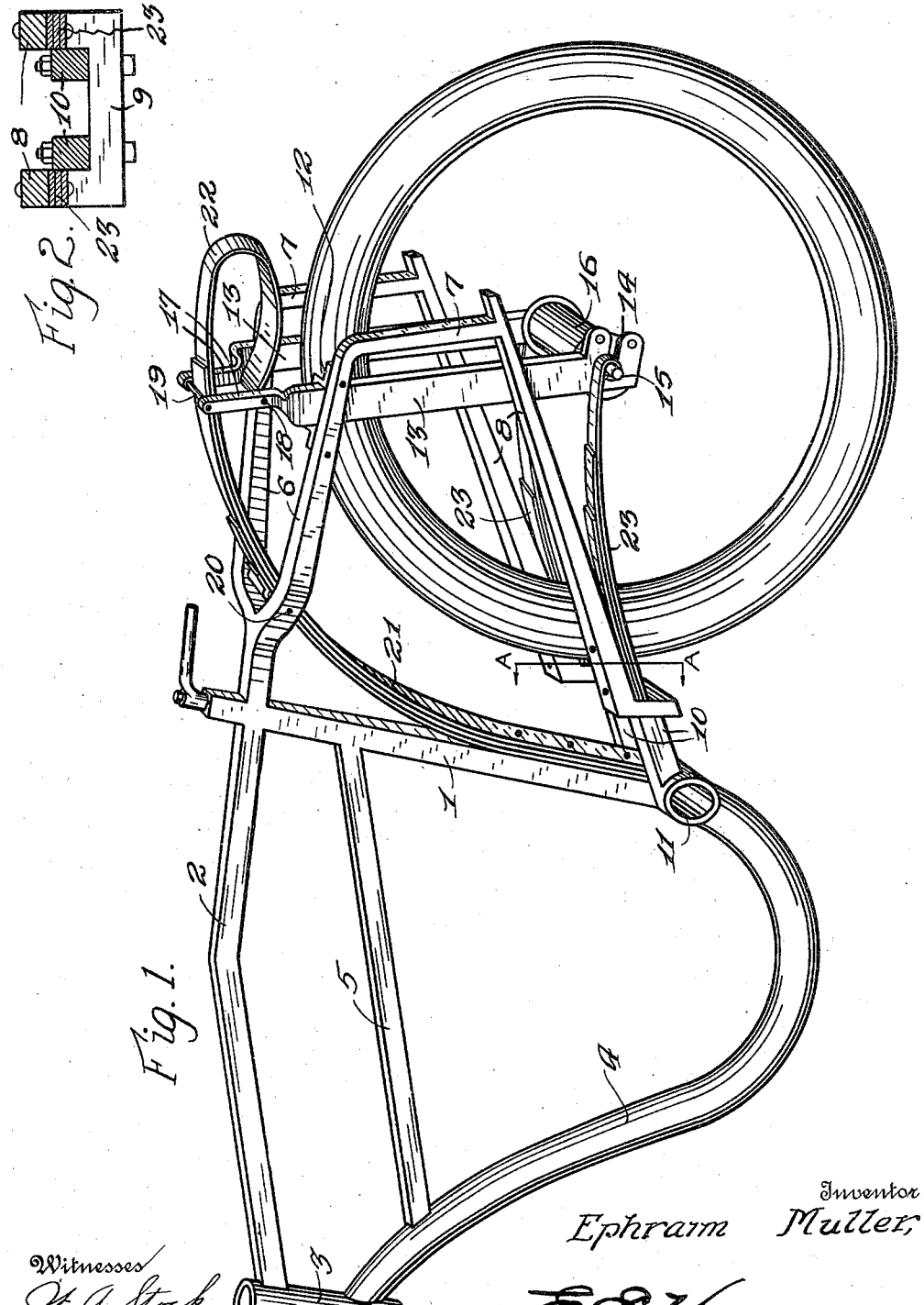

EPHRAIM MULLER, OF OAKLAND, CALIFORNIA.

MOTOR-CYCLE FRAME.

984,018.　　　　Specification of Letters Patent.　　Patented Feb. 14, 1911.

Application filed March 30, 1910. Serial No. 552,381.

*To all whom it may concern:*

Be it known that I, EPHRAIM MULLER, a citizen of the United States, residing at Oakland, in the county of Alameda and State of California, have invented certain new and useful Improvements in Motor-Cycle Frames, of which the following is a specification, reference being had therein to the accompanying drawing.

This invention relates to frames for motor cycles, and the principal object of the same is to provide a frame of great strength combined with ease of riding, in which a novel system of springs are provided for absorbing the shocks and jars incidental to the use of the frame.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of the improved frame. Fig. 2 is a detail sectional view taken on the line A—A, Fig. 1.

Referring to said accompanying drawings by numeral, 1 designates the center post of the frame which has an upper bar connection 2 with the steering head 3. A drop bar 4 connects the lower portion of head 3 with the lower portion of post 1. A brace bar 5 connects the upper portion of drop bar 4 with the upper portion of post 1. Drop bar 4 forms the base support for a motor and bar 5 forms a brace for the upper portion of the motor.

A fork extends rearwardly from the upper portion of bar 1, the spaced parallel arms 6 thereof terminating in pendent parallel bars 7 which connect with the outer ends of spaced parallel horizontal bars 8 the inner ends of which are provided with pendent portions which are connected by a cross bar 9. Cross bar 9 has bar connections 10 with the crank hanger 11 which is located at the junction of post 1 and drop bar 4.

Fork arms 6 are provided with guide loops 12 on their faces, said loops being oppositely disposed and each having a bearing bar 13 slidable therein. Said bars at their lower ends are provided with journals 14 for the shaft 15 of wheel hub 16. The upper portions of said bearing bars 13 are bent inward and reduced and project upward as indicated at 17, said reduced upper portions being connected by the bolts 18 and 19. Fork arms 6 are connected adjacent their inner ends by a pivot bolt 20.

A flat leaf spring 21 has one end portion riveted or otherwise rigidly fastened to the rear of post 1, said spring extending between fork arms 6 and having an intermediate portion fastened to pivot bolt 20. Spring 21 passes beneath and bears against pivot bolt 19 and the outer end portion is projected beyond bearing bars 13 and is returned in the form of a loop 22 and has its end pivotally connected to bolt 18.

The inner end portion of each bar 8 has one end of a leaf spring 23 riveted or otherwise rigidly fastened to its under surface, the other end of said springs being pivotally connected to the projecting ends of axle 15.

It will be seen from the foregoing that the improved frame provides a strong support for the motor and also means whereby the rear wheel is rigidly held against lateral movement, but is permitted to have a yieldable vertical movement.

The action of the spring mounting for the rear wheel is as follows:—Upon said wheel striking an obstruction, the shock will be transferred to hub 16, which compresses springs 23 and causes bearing bars 13 to have a vertical movement against the tension of loop 22 of spring 21, thereby absorbing the shock.

What I claim as my invention is:—

1. A motor cycle frame comprising a center post, a fork projecting rearward from the upper portion thereof, parallel bars projecting rearward from the lower portion of said post, the rear end of said bars and fork being connected, vertically arranged bearing bars slidably mounted in said bars and adapted to carry a wheel axle, an upper spring having one end fastened to said post and its other end pivotally connected to said bearing bars, and a pair of springs having one end connected to the lower parallel bars and their other ends adapted to be pivotally connected to an axle carried by the bearing bars.

2. A motor cycle frame comprising a motor support, a seat post and a rear wheel frame, parallel bearing bars slidable in said rear wheel frame, a wheel axle carried by the lower ends of said bars, springs projecting from the lower portion of the wheel frame and engaging said axle, and an upper spring also projecting from said post and engaging the upper portions of said bars.

3. A motor cycle frame comprising a motor support, a seat post, and a rear wheel frame, parallel bars slidable in said frame, said bars having reduced upper portions, intermediate and end connections for said reduced upper ends, an axle carried by the lower ends of said bars, spring connections between said axle and the lower portion of the wheel frame, and a spring carried by said seat post and bearing against the end connection of said bars and pivotally connected to the intermediate connection thereof.

4. A motor cycle frame comprising a central post, a rearwardly projecting upper fork, a pair of parallel lower arms projecting rearwardly from said post, a pair of vertically slidable wheel carrying bearing bars carried by said fork, a spring having one end connected to said post and its other end pivotally connected to the upper portion of said bearing bars and springs having one end connected to the lower parallel bars and the other end adapted to be pivotally connected to the axle of a wheel carried by the bearing bars.

In testimony whereof I hereunto affix my signature in presence of two witnesses.

EPHRAIM MULLER.

Witnesses:
H. C. SCHROEDER,
F. P. SCHROEDER.